(12) United States Patent
Hoffmann et al.

(10) Patent No.: US 11,449,014 B2
(45) Date of Patent: Sep. 20, 2022

(54) COMBINED LEARNED AND DYNAMIC CONTROL SYSTEM

(71) Applicant: The University of Chicago, Chicago, IL (US)

(72) Inventors: Henry Hoffmann, Chicago, IL (US); Lester Teichner, Chicago, IL (US); Benjamin Vear, Chicago, IL (US)

(73) Assignee: The University of Chicago, Chicago, IL (US)

( * ) Notice: Subject to any disclaimer, the term of this patent is extended or adjusted under 35 U.S.C. 154(b) by 244 days.

(21) Appl. No.: 16/771,410

(22) PCT Filed: Dec. 20, 2018

(86) PCT No.: PCT/US2018/066854
§ 371 (c)(1),
(2) Date: Jun. 10, 2020

(87) PCT Pub. No.: WO2019/126535
PCT Pub. Date: Jun. 27, 2019

(65) Prior Publication Data
US 2020/0348628 A1 Nov. 5, 2020

Related U.S. Application Data

(60) Provisional application No. 62/609,244, filed on Dec. 21, 2017.

(51) Int. Cl.
*G05B 13/02* (2006.01)
*G06F 16/901* (2019.01)
(Continued)

(52) U.S. Cl.
CPC ....... *G05B 13/0265* (2013.01); *G05B 13/042* (2013.01); *G05B 13/048* (2013.01); *G06F 16/2358* (2019.01); *G06F 16/9017* (2019.01)

(58) Field of Classification Search
CPC .............. G05B 13/0265; G05B 13/042; G05B 13/048; G06F 16/2358; G06F 16/9017
See application file for complete search history.

(56) References Cited

U.S. PATENT DOCUMENTS 7,496,414 B2 * 2/2009 Boe ...................... G05B 13/048
703/2
8,036,763 B2 * 10/2011 Boe ...................... G05B 13/042
703/2

(Continued)

FOREIGN PATENT DOCUMENTS

| | | |
|---|---|---|
| CN | 101563660 | 10/2009 |
| KR | 10-2009-0037510 | 1/2010 |

OTHER PUBLICATIONS

International Search Report for International Application No. PCT/US2018/066854 dated Mar. 19, 2019, 1 page.
(Continued)

*Primary Examiner* — Crystal J Barnes-Bullock
(74) *Attorney, Agent, or Firm* — McDonnell Boehnen Hulbert & Berghoff LLP

(57) ABSTRACT

Example embodiments allow for networks of hybrid controllers that can be computed efficiently and that can adapt to changes in the system(s) under control. Such a network includes at least one hybrid controller that includes a dynamic sub-controller and a learned system sub-controller. Information about the ongoing performance of the system under control is provided to both the hybrid controller and to an over-controller, which provides one or more control inputs to the hybrid controller in order to modify the ongoing operation of the hybrid controller. These inputs can include the set-point of the hybrid controller, one or more parameters of the dynamic controller, and an update rate or other parameter of the learned system controller. The over-con-
(Continued)

troller can control multiple hybrid controllers (e.g., controlling respective sub-systems of an overall system) and can, itself, be a hybrid controller.

20 Claims, 5 Drawing Sheets

(51) Int. Cl.
*G06F 16/23* (2019.01)
*G05B 13/04* (2006.01)

(56) References Cited

U.S. PATENT DOCUMENTS

| | | | | |
|---|---|---|---|---|
| 8,577,481 | B2* | 11/2013 | Boe | G05B 13/048 700/44 |
| 10,528,020 | B2* | 1/2020 | Drees | G06F 3/048 |
| 10,528,038 | B2* | 1/2020 | Sayyarrodsari | G06F 8/31 |
| 10,766,489 | B2* | 9/2020 | Tuncali | B60W 30/162 |
| 11,119,455 | B2* | 9/2021 | Sayyarrodsari | G06F 16/9024 |
| 11,199,821 | B2* | 12/2021 | Sayyarrodsari | G05B 13/048 |
| 2008/0065241 | A1 | 3/2008 | Boe et al. | |

OTHER PUBLICATIONS

Hoffmann, "JouleGuard: Energy Guarantees for Approximate Applications", University of Chicago, Department of Computer Science, SOSP'15, Oct. 4-7, 2015.
Saatchi et al., "Bayesian GAN", 31st Conference on Neural Information Processing Systems (NIPS 2017), Nov. 8, 2017.
Celestine Dunner et al., "IBM scientists demonstrate 10x faster large-scale machine learning using GPUs", Dec. 4, 2017.
Cho et al., "Computer Science>Distributed, Parallel, and Cluster Computing, Title:PowerAI DDL", Aug. 7, 2017.
Zhang et al., "Performance & Energy Tradeoffs for Dependent Distributed Applications Under System-wide Power Caps", ICPP 2018, Aug. 13-16.
Stoica et al., "A Berkeley View of Systems Challenges for AI", Dec. 15, 2017.
Ma et al., "Statistics>Machine Learning, Title:Diving into the shallows: a computational perspective on large-scale shallow learning", Mar. 30, 2017.
Tu et al., "Mathematics>Optimization and Control, Title:Non-Asymptotic Analysis of Robust Control from Coarse-Grained Identification", Jul. 15, 2017.
Santriaji et al., "Formalin: Architectural Support for Power & Performance Aware GPU", 8 pages.
"CALOREE: Combining Control and Learning for Predictable Performance and Low Energy", Conference '17, 15 pages.
Engel et al., "Latent Contraints: Learning To Generate Conditionally From Unconditional Generative Models", Nov. 15, 2017, 19 pages.
Yang et al., Making Open VX Really "Real Time", 14 pages.
Silver et al., "Mastering Chess and Shogi by Self-Play with a General Reinforcement Learning Algorithm", Dec. 5, 2017, 19 pages.
Dean et al., "Mathematics>Optimization and Control, Title:On the Sample Complexity of the Linear Quadratic Regulator", Oct. 4, 2017.
Tu et al., "Mathematics>Optimization and Control, Title:On the Approximation of Toeplitz Operators for Nonparametric /mathcal[H]_ \infty—norm Estimation", Sep. 29, 2017.
"A Divide and Conquer Algorithm for DAG Scheduling under Power Constraints", 12 pages.
Pei et al., "SLAMBooster: An Application-aware Controller for Approximation in SLAM", Nov. 5, 2018, 15 pages.
Santriaji et al., "MERLOT: Architectural Support for Energy-Efficient Real-time Processing in GPUs", 12 pages.
Lessard et al., "Analysis and Design of Optimization Algorithms via Integral Quadratic Constraints", Oct. 28, 2015, 40 pages.
Dean et al., "On the Sample Complexity of the Linear Quadratic Regulator", Oct. 4, 2017, 32 pages.

* cited by examiner

COMBINED LEARNED AND DYNAMIC CONTROL SYSTEM

CROSS-REFERENCE TO RELATED APPLICATION

This application is a US national phase of International Application No. PCT/US2018/066854, filed Dec. 20, 2018, which claims priority to U.S. Provisional Patent Application No. 62/609,244, filed Dec. 21, 2017, which are incorporated herein by reference.

BACKGROUND

A controller that controls a particular system (e.g., to maintain an output of the system at a desired level) can be configured in a variety of ways. In some examples, the controller may include a component that has been trained or otherwise specified to represent a model of the system to be controlled. The controller may also include a dynamic component (e.g., a filter or other dynamic control structure) in combination with such a system-modeling component, to improve the dynamic response of the overall controller. However, such a controller, despite including a component specified to model the internal structure of the system under control, may perform sub-optimally wider conditions that differ from those used to, e.g., generate the training data used to train the system-modeling component of the controller.

SUMMARY

To improve the control of a system of interest, a hybrid controller may be provided that includes both dynamic components (e.g., filters or other dynamic controller elements) and components that have been specified to model the system under control (e.g., a learned system model trained based on observed past behaviors of the system under control). Such a hybrid controller may provide better outputs, with respect to controlling the output of the system or with respect to some other operational parameter of interest, relative to alternative controllers that only include dynamic elements or system-modeling elements. Hybrid controllers may also be implemented cost-effectively and with minimal compute resources (e.g., cycles, memory, cores). Hybrid controllers are able to generate control outputs that may take into account learned information about the complex structure of the controlled system (via the system-modeling component) while also providing certain formal guarantees regarding the performance of the hybrid controller (due to the presence of the analytically-tractable dynamic component).

However, such a hybrid controller may exhibit suboptimal behavior under certain circumstances. For example, if the system under control and/or the environment of the system differ significantly from the conditions used to develop the hybrid controller (e.g., to train a learned system model of the controller), the hybrid controller may produce sub-optimal outputs. In such examples, an additional controller (e.g., an additional hybrid controller) may be provided to monitor and govern the hybrid controller. This additional controller can receive the output of the system under control by the hybrid controller and could, based on that output, provide one or more outputs to control the operation of the hybrid controller. Such outputs could include one or more constraints of the hybrid controller (e.g., a set-point used for feedback control of the system, a delivery latency constraint). Such outputs could include values for one or more parameters of the dynamic and/or learned system model components of the hybrid controller. For example, the output of the governing controller could be a magnitude or phase of a pole of a filter, a feedback gain, or some other operational parameter of the dynamic component of the hybrid controller. In another example, the output of the governing controller could be a learning rate or other parameter of the learned system model component of the hybrid controller. In some examples, the output of the governing controller could be a determination that a process should be performed on the hybrid controller, e.g., that the learned system model of the hybrid controller could be asynchronously updated and/or enter a learning mode. In another example, the output of the governing controller could be a selection of a new learning model to be used in the learned system component; e.g., switching from a regularized regression model to a Bayesian model. In another example, the output of the governing controller could indicate a new actuator to be controlled by the hybrid controller, e.g., if a new resource becomes dynamically configurable after the original hybrid controller was deployed.

Such a governing controller could be used to control multiple hybrid controllers. Additionally or alternatively, multiple governing controllers (e.g., multiple governing hybrid controllers) could control one or more hybrid controllers in common. Each of the hybrid controllers controlled by a governing controller could control a respective sub-system of a larger overall system. For example, a first hybrid controller could control battery charge/discharge circuitry of an electric vehicle and a second hybrid controller could control a drive motor of the electric vehicle. In such examples, the governing controller could be considered to be effectively controlling the overall system via the subordinate hybrid controllers. The governing controller could control the overall system by applying inputs (e.g., set-point values or other constraints, filter poles or other dynamic system parameters, learning rates or other learned system model parameters) to or otherwise modifying or controlling the operation of the subordinate hybrid controllers which, themselves, directly control their respective sub-systems. In some examples, such a governing controller could, itself, be a hybrid controller.

An aspect of the present disclosure relates to a method implemented by one or more computers, controllers, micro-controllers, graphics processing units, tensor processing units, application-specific integrated circuits, and/or some other variety of computational substrate, the method including: (i) detecting, during a first period of time, one or more outputs of a system; (ii) determining, based on the one or more outputs detected during the first period of time, a first performance metric for the system; (iii) operating a first hybrid controller, based on at least the first performance metric, to generate a first hybrid controller output; (iv) controlling the system, during a second period of time, according to at least the generated first hybrid controller output; (v) detecting, during a third period of time, the one or more outputs of the system; (vi) determining, based on the one or more outputs detected during the third period of time, a second performance metric for the system; (vii) operating a second hybrid controller, based on at least the first performance metric and the second performance metric, to generate an updated constraint value; (viii) updating the first constraint according to the updated constraint value; (ix) operating the first hybrid controller, based on at least the second performance metric, to generate a second hybrid controller output; and (x) controlling the system, during a fourth period of time, according to at least the generated second hybrid controller output. The first hybrid controller includes a first constraint, a first dynamic system, and a first learned system model, and operating the first hybrid controller to generate the first hybrid controller output includes: (1) determining a first difference between the first performance metric and the first constraint; (2) applying the determined first difference to the first dynamic system to generate a first dynamic system output; and (3) applying the generated first dynamic output to the first learned system model to generate the first hybrid controller output.

Another aspect of the present disclosure relates to a method implemented by one or more computers, controllers, micro-controllers, graphics processing units, tensor processing units, application-specific integrated circuits, and/or some other variety of computational substrate, the method including: (i) detecting, during a first period of time, an output of a system; (ii) determining, based on the output detected during the first period of time, a first performance metric for the system; (iii) operating a first hybrid controller, based on the first performance metric, to generate a first hybrid controller output; (iv) controlling the system, during a second period of time, according to the generated first hybrid controller output; (v) detecting, during a third period of time, the output of the system; (vi) determining, based on the output detected during the third period of time, a second performance metric for the system; (vii) operating a second hybrid controller, based on the first performance metric and the second performance metric, to generate a first hybrid controller update, wherein the first hybrid controller update includes at least one of an updated first constraint value, an updated first dynamic parameter, or an updated first learning parameter; (viii) updating the first hybrid controller according to the first hybrid controller update; (ix) operating the updated first hybrid controller, based on the second performance metric, to generate a second hybrid controller output; and (x) controlling the system, during a fourth period of time, according to the generated second hybrid controller output. The first hybrid controller includes a first constraint, a first dynamic system, a first learned system model, and a first learned system update module. The first learned system update module is configured to update the first learned system model based on at least one output detected from the system and to update the first learned system model according to at least one of a timing or a rate corresponding to the first learning parameter. The first dynamic system has a first dynamic parameter that corresponds to an overall responsiveness of the first dynamic system. Operating the first hybrid controller to generate the first hybrid controller output includes: (1) determining a first difference between the first performance metric and the first constraint; (2) applying the determined first difference to the first dynamic system to generate a first dynamic system output; and (3) applying the generated first dynamic output to the first learned system model to generate the first controller output;

These as well as other aspects, advantages, and alternatives will become apparent to those of ordinary skill in the art by reading the following detailed description with reference where appropriate to the accompanying drawings. Further, it should be understood that the description provided in this summary section and elsewhere in this document is intended to illustrate the claimed subject matter by way of example and not by way of limitation.

DETAILED DESCRIPTION

Figure 1A:
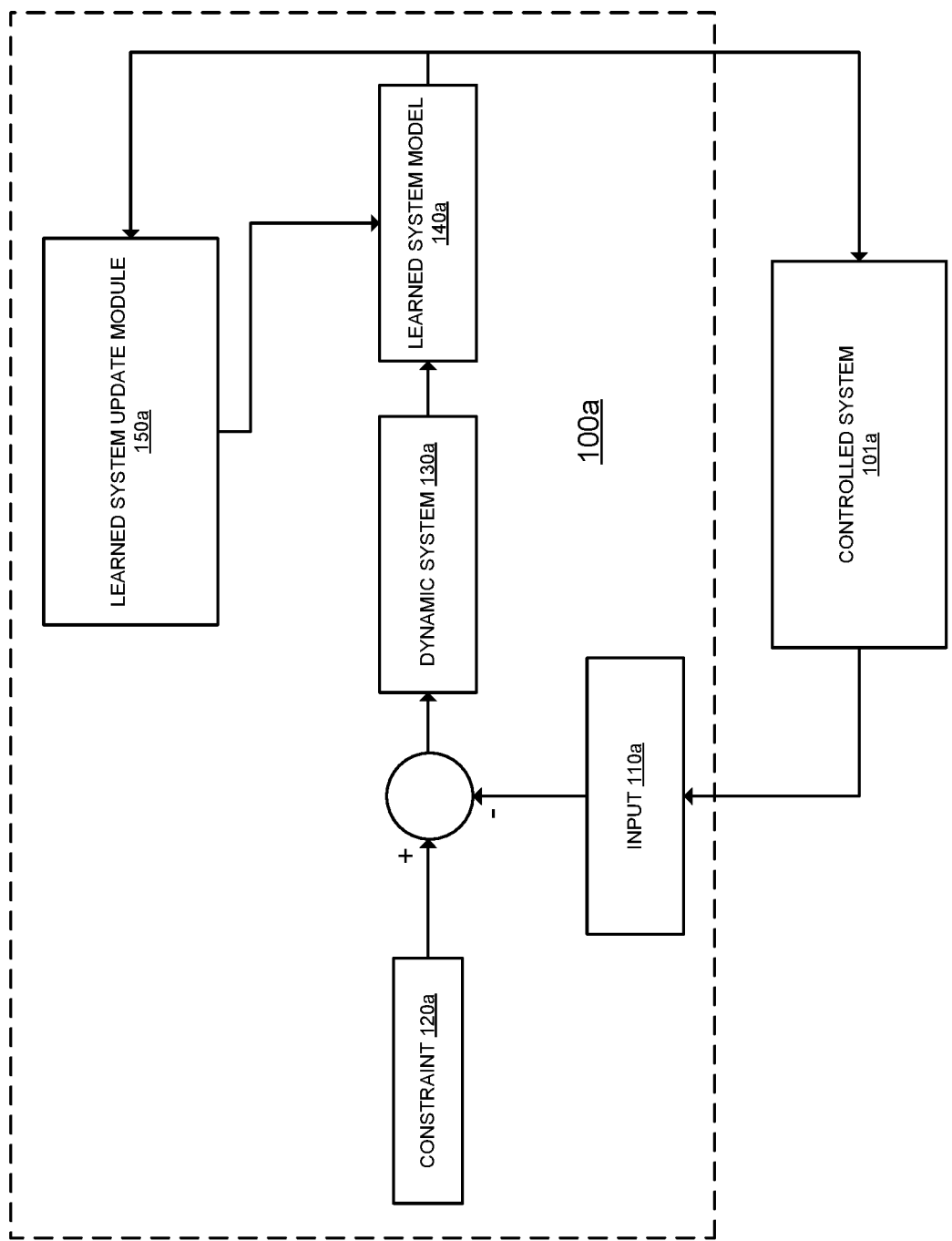
FIG. 1A depicts a schematic of an example hybrid controller.

Examples of methods and systems are described herein. It should be understood that the words "exemplary," "example," and "illustrative," are used herein to mean "serving as an example, instance, or illustration." Any embodiment or feature described herein as "exemplary," "example," or "illustrative," is not necessarily to be construed as preferred or advantageous over other embodiments or features. Further, the exemplary embodiments described herein are not meant to be limiting. It will be readily understood that certain aspects of the disclosed systems and methods can be arranged and combined in a wide variety of different configurations.

This application incorporates by reference the contents of Wang, Shu, et al. "Understanding and Auto-Adjusting Performance-Sensitive Configurations." *Proceedings of the Twenty-Third International Conference on Architectural Support for Programming Languages and Operating Systems*. ACM, 2018; Zhang, Huazhe, and Henry Hoffmann. "Performance & energy tradeoffs for dependent distributed applications under system-wide power caps." *Proceedings of the 47th International Conference on Parallel Processing*. ACM, 2018; an Santriaji, Muhammad Husni, and Henry Hoffmann. "Formalin: Architectural Support for Power & Performance Aware GPU." 2018 *IEEE Conference on Control Technology and Applications (CCTA)*. IEEE, 2018.

I. OVERVIEW

This disclosure discloses systems, methods, and apparatuses for supervising, controlling, improving and/or optimizing performance of a hierarchical or distributed or other complex systems comprised of one or more sub-systems, by combining machine learning and control theory to create one or more expanded machine learned control systems that ensure that such a complex system performs optimally in dynamic operational conditions, wherein each one or more sub-system has similar, different or common local and/or global goals and each one or more controlled sub-system(s) in such complex system being closely or loosely coupled in hardware and/or software for the purpose of optimization and/or supervision of one or more or all sub-system(s) collectively.

Some of the disclosed embodiments are related to supervising and/or optimizing such control system(s) or sub-system(s)) by using a performance method(s) that is based on, but not limited to, dynamically monitoring, learning, and changing configurations of the control system(s) while executing the application and assessing data of the system's operational performance. The system or sub-system(s) may also dynamically adjust its at least one constraint and/or one performance goal being controlled and/or adjust the supervisory control system itself.

Some of the disclosed embodiments are related to using the meta data derived from evaluation of the dynamic changes in system performance over time resulting from such optimization and/or supervision of the targeted constraint(s) and/or performance goal(s) to, e.g., establish beneficial constraints and performance goals, to prevent cascading, competing, local minimum/maximum, or other failures in one or more systems or sub-systems, to develop advanced learning methods that are more efficient for producing outcomes, e.g., to wholly or partially replacing and/or otherwise improving performance of Generative Adversarial Networks, for evaluation and/or improvement of machine learning methods operationally (artificial intelligence; neural networks, or other such methods), for temporal, sequential or other simulations of potential outcomes, etc.

Machine learned control systems (artificial intelligence) are being widely developed and deployed throughout industry in applications ranging from financial transactions, autonomous vehicles, logistic systems, chips and microprocessors, military systems and others. Under unsupervised, supervised, or the supervised component of semi-supervised learning, each of these systems requires the initial "learning" of large data sets that describe the environment of the application to be controlled, then processed through neural networks of varying complexity, then tested to ensure that once deployed, the control system "knows enough" to provide a high probability of desired outcomes. Under unsupervised or the unsupervised component of semi-supervised learning, this data is often generated.

Typically, the more data the greater the probability of these desired outcomes, in the attempt to develop control solutions that can operate near optimally. In practice, however, performance can be sub-optimal, the inner workings of neural networks or other learned prediction and/or control algorithms are not easily understood, data is often expensive to acquire or limited in breadth, and the machine learned control system must update its learning set and operating logic as it operates in real time and can gather its own additional operational data.

The techniques of traditional control theory, where system operating parameters may be derived from known differential or difference models, contrast with machine learned systems, which produce probabilistic control outcomes and provide varying degrees of uncertainty regarding the "completeness" of the learning or other data set(s) and the risk of encountering operational conditions that are unanticipated.

The methods of machine learning and control theoretic techniques can be combined into what we describe as "hybrid control systems." These hybrid control systems introduce the traditional ideas of dynamic optimization using one or more targeted constraints and/or performance goals, deeply integrated to enhance the capability of machine-learned systems by building predictive tables that are highly responsive to system operation around the targeted constraints and/or performance goals that more rapidly drive the underlying machine learned system to its optimal overall targets when encountering unlearned conditions, unanticipated 'bad behaviors', or other unplanned or unexpected events.

For example, these complex, machine learned systems may be applied to accelerate the learning process by creating various mathematical methods such as Generative Adversarial Networks using Bayesian and other methods, e.g., DCGAN, Wasserstein GANs, and DCGAN ensembles, whether for supervised, unsupervised, or semi-supervised systems, including those using reinforcement learning, transfer learning, or active learning.

For example, these adversarial deep neural networks have proven more effective at both conditional and unconditional modeling of complex data distributions; conditional generation enables interactive control, but creating new controls or updating previous modeling often requires expensive retraining; regardless, the goal is to develop better modeling (i.e. faster, more economical, better prediction and many others).

Learning can be expensive and time consuming and a variety of techniques may be applied to better understand the internal operations of neural networks to reduce the demands on the size and breadth of required learning sets, e.g., by reducing precision from 32 and 64 bit precision to 4 and 8 bit precision computation. Most of these methods are being developed to better understand, e.g., computational efficiencies, assess risks or performance, improve the accuracy of unsupervised learning, reduce unintended consequences, and reduce the time to market with reliable and understandable machine learned systems.

Neural networks have good empirical performance, but their internal workings are poorly understood. Other techniques may be applied to improve the empirical performance of learning techniques that have better understood mathematical properties, e.g., various kernel and spectral learning methods.

In general, prior work has failed to provide systems nor methods for one or more of simulating, creating, observing, learning from, simultaneously supervising, and/or optimizing a hierarchical, distributed, or other complex control system made up of loosely or closely coupled individually optimized sub systems operating together or in one or more combinations making decisions with the same, related, or different constraint(s) and/or performance goal(s), e.g., a complex system comprised of one or more hybrid control systems;

Nor does this prior work provide the means for correcting behavior if the dynamic operating environment violates those initial or other conditions, nor does it provide the means for learning how to optimize the behavior of the distributed hierarchical system over time if the misbehavior of one or more sub-systems becomes "normal" behavior over a time period;

Nor does it provide for any static or dynamic systems or methods for establishing, operationally monitoring, or dynamically changing the optimal constraint(s) to improve the response times to the systems' global optimal performance goal(s), nor does it provide for using the run-time supervisory and/or optimization performance data to, e.g., develop or dynamically change the at least one constraint and/or performance goal(s) of the supervisor itself.

Nor does it provide the means to initially set up, then monitor, then control the actual performance of the system or method in a real-time operating environment, to develop better machine learning methods, to simulate various outcomes using different constraint and or performance goal targets, whether temporal, sequential or otherwise.

We describe a system, method, and apparatus for: (1) creating and controlling a complex control system of at least one distributed and/or hierarchical machine-learned control system(s), whether closely or loosely coupled in hardware and/or software, supervising, and/or optimizing an individual complex system or sub-system or a collection of complex systems or sub-systems, to meet a set of at least one constraint and/or performance goal, which may be identical, different, grouped, or otherwise set for each system or sub-system;

(2) monitoring the performance of the control system in its static or dynamic operating environment in meeting its at least one constraint and/or performance goal;

(3) determining when the monitored system or sub-system is behaving or failing to meet the specified constraints optimally;

(4) dynamically adjusting the learner, controller, or another system (e.g., adjusting a goal or other operational parameters of such systems) to respond to this behavior;

(5) using data from the operation of the complex control system to supervise the behavior to create optimization goals if the misbehavior of one or more sub-systems is the "new normal";

(6) enabling the creation of control system optimization and or supervisory parameters during the initial process of creating the machine learned control system and then to monitor and either statically or dynamically, either machine-learned or otherwise, adjust the dynamic performance of the distributed system either globally or in any one more of its components or in the management of itself;

(7) enabling the system or any of its sub-systems to dynamically adjust its at least one constraint and/or performance goal;

(8) using the information on performance of the system or subsystem(s) to create a database and library or similar record of performance metrics which can be used to make decisions, predictions, and/or simulations for the underlying system or sub system(s) and/or for other related and/or non-related systems used by others;

(9) using dynamic operating information on optimization and/or supervisory actions (i.e. performance meta data) to reduce the demands on the requirements for supervised, unsupervised, or semi-supervised data sets, including but not limited to new methods for deep learning; and

(10) for simulating the effect of various different constraints and/or performance goals had they been selected or configured differently, either machine learned or otherwise, to evaluate the hierarchical distributed system configuration possibilities, given the actual data being acted on over time by the underlying control system.

Prior work has disclosed systems and methods for increasing the robustness of complex, optimized machine learned systems in response to the real-world monitoring of dynamic events.

Machine learning and control theoretic capabilities may be applied to existing complex systems. The learning system takes measurements of system behavior and uses that to construct an optimization model. The model is passed to a control system, which uses that model, plus the specified constraints, and the measured system behavior to adjust parameters and ensure that the constraints are met optimally.

The benefits of this approach are two-fold. First, the combination of learning and control handles both complexity and dynamics, and out-performs approaches that rely on only one or the other (for descriptive purposes only, we will identify these control systems that have a machine learned component and a control theoretic component as "Hoffmann Optimization Frameworks", "HOF s," "Frameworks," "abstracted controllers," "abstracted control systems," "hybrid controllers," or "hybrid control systems").

Second, the combination makes the resulting system provably robust; i.e., the tolerable error of the system can be easily determined and configured between the learned models and actual operational behavior that still allows the combination to converge to specified constraints.

In general, a complex, optimized system using a HOF is observable and adjustable. Specifically, we know the specified constraints and the system has already been instrumented to produce feedback measuring the behavior in any constrained dimension. We can therefore observe the quality of HOF control which includes, but is not limited to: does the system stabilize or oscillate? If it does not oscillate, does the system stabilize to the desired constraint? If not, how far is the stable behavior from the desired behavior? When an unexpected event de-stabilizes the system how long does it take to respond? For that same event, what is the largest error encountered on the path back to stability? Once the system stabilizes at the desired behavior, how far is it from the estimated optimal for those constraints? The answers to all these questions can be quantified using the measured difference between the specified constraints and the behavior feedback.

This insight—that an optimized system can be further evaluated and therefore provide supervision as a standalone supervisor or varying supervision in a hierarchical and/or distributed complex control system, or in combination with an optimization strategy and/or tactics while in the field—allows the systems and methods described in this disclosure to provide a variety of benefits.

A complex control system under the supervision of a HOF has at least one constraint and/or performance goal from which the control system optimizes the system based upon response to real-time, dynamic in-flows of data regarding the operation of itself or other HOFs in the system. We also describe herein the system or method of setting constraints and performance goals that themselves may be evaluated and selected to further optimize the optimization of the system being controlled, whether one HOF or in a complex of more than one HOF working in a hierarchical system with one or more HOFs. The complexity of such analysis may in one example itself require use of a HOF (machine-learned or otherwise) to use operational data for setting or consideration of options for setting optimal static or dynamic constraints and performance guarantees consistent with the system's performance goals.

A HOF's behavior can be represented as the difference between the achieved behavior and the constraints over a series of time steps. A well-behaved controller will keep the performance near the requirement, optimally correcting deviations.

The major insight in applying these mechanisms is the insight that the time series difference between the desired and achieved behavior in any constrained dimension can be used to detect—and drive adjustment of—both the learning and control behavior. More formally, the error e between any constraint c and the measured behavior b at time t can be calculated as $e(t)=c(t)-b(t)$.

For example, once we have computed the error at time t, it can be used to detect a combined learning and control system that is misbehaving. If the HOF is misbehaving, then it may exhibit one or more of a variety of behaviors, including:

Oscillation:

The system never stabilizes, but alternates between under- and over-performing the constraint(s) and/or performance goal(s). The patterns of oscillation can be quite complicated, passing through many intermediate states on the way to extremal values. Such oscillation can be exhibited by errors that go from positive to negative values and back.

Slow Response to Dynamic Changes:

When the error suddenly becomes a large positive or negative number, but then takes many time steps to return to a magnitude close to zero.

Consistently Under-Performing:

The system stabilizes at performance below the goal, resulting in a large positive error.

Consistently Over-Performing:

The system stabilizes at performance above the goal, resulting in a large negative error.

Favoring One Side of the Constraint:

Rather than an even distribution of measurements slightly above and below the behavioral constraint, the controller disproportionately favors one side of the constraint.

Given the detection of these or other misbehaviors, we can modify the learner, the controller, the goals themselves, or some other parameter of the control system:

Modifying the Learner:

Prior work assumed that the learning system eliminated local optima, allowing the controller to solve convex optimization problems. Expected or unexpected behaviors might introduce new local optima, however, causing the controller to exhibit behaviors including but not limited to "oscillation" or "favoring one side of the constraint" as described above. Thus, if oscillating behavior or favoring one side of the constraint is detected, then the learner's parameters can be adjusted to incorporate the new data-point. In one of the simplest cases, the selected configuration of the complex system and the resulting behavior can be recorded and added to the learner's training data. In that case, for example, the learner can output a new model that removes the local optima and achieves the expected, stable performance. If the learner is already built to do online updates (for example, a reinforcement learner of some kind) then the system may adjust the learning rate to increase the speed with which the new information about the local optima is incorporated to the model used by the control system.

Modifying the Controller:

Control systems of all varieties expose parameters that trade sensitivity to errors for speed of convergence given a disturbance. For example, in PID controllers these variables include one or more poles. Given an oscillating system or a system that heavily favors one side of the constraint, these control parameters can be adjusted to increase convergence speed in exchange for higher error tolerance. This adjustment will prevent the system from violating constraints, but the unconstrained behavior may still be sub-optimal. Adjusting these control parameters can also be useful in the case where the system is observed to re-converge too slowly after a dynamic event. For example, it is possible that the original system was too pessimistic and designed for error conditions that are not encountered in a real deployment so adjusting the control parameters allows the system to accommodate this better than expected behavior. In either case, it can be useful to combine an adjustment of control parameters with adjustment of learning parameters. For example, in the face of an unexpected error causing oscillations, the control parameters can be adjusted to slowdown the controller and eliminate oscillations immediately, while learning parameters can be adjusted slowly to produce a new model that incorporates the new operating conditions.

Modifying the Goals:

In addition, the learning and control parameters themselves may be modified. Additionally or alternatively, a new, virtual goal may be created. A virtual goal can be used to correct behaviors that were not otherwise detectable and/or expected at design time. For example, if the deployed environment is much noisier than expected—e.g., variations are higher than designed for—the proposed system may override the specified constraint and set a new constraint that is in a different operating range. For example, if a system has a $95^{th}$ percentile quality-of-service constraint, but runtime variations are larger than expected, then a virtual goal may be set that provides even higher quality-of-service. In another example, it is possible that the system that has been deployed may no longer be able to meet a user-specified goal or goals. The unreachability of goals can be tested using standard control methodology (which may be typically applied at design time, and here modified for runtime or other assessment(s)). This controllability test may allow the system to formally conclude that it can no longer meet the specified goals. In this case, the system may set a virtual or other goal that is different than the desired goal and then may report the condition.

Machine learned systems cannot easily handle challenges unique to many performance configurations, such as hard constraints—e.g., not going out of memory—and indirect relationships between performance configurations and performance. This is made even more complex and challenging when the system is architected to include, e.g., a hierarchical or distributed architecture of individual or relational components or sub-components.

There are many challenges in setting and adjusting performance configurations in such a distributed architecture, e.g.: (1) performance configurations that threaten hard performance constraints like out-of-memory or out-of-disk problems; (2) performance configurations that affect performance indirectly through setting thresholds for other system variables; (3) performance configurations that are associated with specific system events and hence only take effect conditionally; (4) often different configurations affect the same performance goal simultaneously, requiring coordination; (5) in hierarchical systems controlling sub-systems with local goals and a master, overriding system with global goals, conflicts may arise requiring immediate response and coordination; (6) real-time events may cause a long lasting change in the conditions of "normal" to a "new normal" and may render one or more constraints temporarily or permanently, partially or wholly inappropriate or even dangerous; and (7) resolution of potential conflicts or coordination requirements that arise between optimization and supervision roles of the control system.

Unlike traditional configuration frameworks—where users set performance configurations at system launch—in certain embodiments the Hoffmann Optimization Framework automatically sets and dynamically, during operation, adjusts performance configurations across a distributed architecture which can include one or more HOFs in a loosely or closely coupled hardware and/or software control system. The Hoffmann Optimization Framework decomposes the performance configuration setting problem.

The HOF, whether supervising and/or optimizing other performance metrics, allows performance constraints, goals and/or formal guarantees to be specified without worrying about how to set and adjust configurations to meet those constraints and/or goals. The HOF can do so, for example, on distributed complex systems, in the presence of other complex systems with or without one or more HOFs. While it provides these optimization capabilities to set performance configurations to constraints and/or goals either dynamically (on the fly), statically, or by other means, it additionally provides the capability to also act as a supervisor of a group of complex systems or a group of one or more HOFs, to monitor, administer, or otherwise optimize performance to goals and constraints.

As noted above, one of the major advantages of these control systems is making complex, optimized systems robust to, e.g., misbehaviors, errors and or other suboptimal situations or configurations that may occur while the system runs. Such situations, whether singularly or in combination can arise from a number of causes, e.g., the system encountering an environment for which it was not originally designed, and the exact causes do not need to be understood or detected.

One limitation of the prior work is that it may ignore the real-world conditions that often arise when, e.g., multiple separate components (subsystems) contribute to overall system performance and each of these subsystems are optimized for their own specific requirements locally as well as the system globally.

For example, in a 3-tiered webserver, overall latency and power is determined by latency and power of the (1) load-balancer, (2) request manager, and (3) backend database. In large systems these individual components can operate semi-autonomously and can be physically separate. Other examples include complex fleets of drones and other delivery vehicles operating co-operatively with other physical assets in a complex logistics system, or an autonomous vehicle with both internal and external performance goals, etc.

Managing multiple HOF implementations can be further complicated when in operation, the local or other goals (performance guarantees and/or constraints) of individual HOF implementations for unique subsystems may at times either expand or reduce the array of global solutions and the timing of their implementation to meet global performance goals.

A supervisory HOF method is needed for optimizing these distributed complex control systems. We disclose herein a system and method wherein a high-level HOF controller (or multiple such high-level HOF controllers) has at least one constraint and/or a performance goal for the system performance in its entirety, and tracks and manages progress towards the global goals being managed by subordinate local HOFs and or other means as they work to meet their individual local goals.

In some examples, a HOF can be used to control a distributed hierarchy comprised of at least one HOF implementation.

In some examples, constraints and/or performance goals can be used to control a HOF which itself is being used with similar or different constraints as it controls a single or multiple HOF architecture in a simple or complex distributed system.

In some examples, constraints and/or performance goals can be used to control a HOF which is controlling itself and/or manages its own resource utilization in a single or multiple HOF architecture in a simple or complex distributed system.

In some examples, a HOF or a network comprised of one or more HOFs can be applied to the role of supervision and/or optimization of the control system by monitoring operational data, collecting and reporting data on the performance of the control system and then responding.

An example includes monitoring the number of pixels being used from an image processor to make autonomous vehicle decisions. If the images do not meet the system requirements, the supervisory role would evaluate if the number of pixels available and other elements of the imaging system from the image processor were in the acceptable range for that sensor, and then use the best solution to infer action based upon established constraints and performance goals. Information can then be available to the learner for later optimization decisions.

In some examples, a HOF can be used in the role of optimization and/or supervision either singularly or in combination, as it controls and/or optimizes a single or multiple architecture comprised of at least one or more HOFs in a simple or complex distributed control system.

Another limitation of a singular deployment of a Hoffmann Framework is that the maximum tolerable error has to be known or estimated when the system is designed. If the system is deployed and an unexpectedly large error occurs (e.g., due to unpredicted cascading system failures), then the guarantees that the system will meet user-specified operating constraints are lost.

To compensate for this limitation, the present disclosure provides systems and methods to overcome the above limitation, allowing the complex, optimized system to continue to run even when it encounters, e.g. cascading runtime errors or when the misbehavior becomes "the new normal."

In some examples, one or more HOFs can be used to control and/or optimize one or more HOFs or other control methodologies to create operational boundaries; e.g., by removing actuators from control of the original or other systems.

In some examples, the behavior of the hierarchical and or distributed control system is supervised as it responds to static or dynamic operational data and to adjust constraints and/or performance guarantees to further optimize the means to meet global or local goals.

In some examples, operational "meta-data" derived from the operation of the complex control system and the performance of the underlying complex system being controlled is collected as operational data and used to inform the control system(s) collectively or individually or in combination and the responses are observed and recorded. Temporal and event sequencing information (among others) are used dynamically to set operational performance changes responsive to run-time operating conditions and targets for both supervisory and/or optimization HOF(s), as well as for later analysis and system performance improvements of the learner and/or the controller, so as to analyze alternatives to create idealized optimization strategy(s) and/or static or dynamic tactic(s) for the underlying system or for other uses with other data from other systems.

In some examples, the tools from such an analysis are used to create constraints and/or performance goals for one or more HOFs that are dynamic over time and change in response to the operating data being evaluated over that same time period, such that, for example, optimization, and/or supervision goals at any time may be the same or different depending on operational performance.

These tools may be deployed initially as simulations using, e.g., test data or learning sets or other simulations responsive to incoming data. These tools may also be deployed on a running system, on a simulation, or a combination of simulation(s) and running system(s).

For example, these tools may employ, e.g., machine-learned tools and may be deployed electronically, with or without human involvement and/or in systems that combine both methods or novel methods such as natural language generation derived reports.

II. EXAMPLE HYBRID CONTROLLERS

The term "hybrid controller," as used herein, refers to a controller that includes multiple different sub-components that, together, generate one or more control outputs (e.g., outputs applied to a system under control) based on one or more control inputs (e.g., inputs detected or otherwise received from the system under control). The different components of such a hybrid controller receive respective inputs and generate respective outputs, and the output of a component may be provided as inputs to another component, according to the particular configuration of the hybrid controller. In a particular example, a hybrid controller may include a dynamic system component and a learned system model component. The dynamic system component could include one or more filters, integrators, differentiators, gains, or other elements to allow the controller to exhibit temporal dynamics (e.g., temporal dynamics characterized by one or more poles and/or zeros) and to provide certain formal guarantees regarding overall controller/system performance. The learned system model component could include lookup tables, polynomial functions, multivariate functions, arbitrarily complex behavior encoded in a neural network or other model, or some other elements based on information (e.g., training data) about the behavior and/or structure of the system to be controlled to allow the hybrid controller to provide controls adapted to observed optimal (and suboptimal) past behavior of the system under control, to exhibit complex nonlinear and/or multidimensional behaviors, and to provide many outputs based on few inputs. The hybrid controller could include multiple such learned system models, which the hybrid controller could switch between (e.g., based on a degree of confidence in the accuracy of each the learned system models with respect to data received about the operation of the system under control).

The hybrid controller could also include a learned system update module configured to train or otherwise update the learned system model(s) based on newly-received data about the operation of the system under control. Such a learned system update module could operate to update the learned system model(s) according to an update schedule (e.g., to update the learned system module once every number of elapsed absolute seconds, a number of controller time steps computed, or some other schedule) and/or according to a timing determined from some other information or conditions (e.g., to update the learned system model when the observed behavior of a system under control deviates from the behavior predicted by the learned system model by more than a specified threshold amount). Such a learned system update module could operate to update the learned system model by a specified amount, e.g., by a step size or length related to a gradient descent training method.

FIG. 1A shows an example hybrid controller 100a that is configured to control a system 101a of interest. The system could be any system of interest, e.g., one or more processors of a server or some other computing substrate, a distribution hub or other facility of a logistics network, a joint motor or other subcomponent of a robotic system, or some other system which it is advantageous to control. The hybrid controller 100a includes a constraint 120a, a dynamic system 130a, a learned system model 140a, and a learned system update module 150a. The hybrid controller 100a also receives an input 110a from the controlled system 101a.

The constraint could be, for example, a specified set-point value for the output of the system 101a; the controller 100a may generate outputs to control the system 101a in order to mirror such a constraint 120a value in the output of the system 101a. An output of the system 101a is detected and then compared to the constraint via an input 110a. In some examples, the input 110a could simply be a pass-through for the detected output of the system 101a. Additionally or alternatively, the input 110a could include a filter, a transfer function, or some other algorithm or other relationship to generate a useful input value (e.g., a performance metric describing an overall performance of the system) based on the one or more detected outputs of the controlled system 101a. For example, the output of the system 101a could be a number of operations-per-second performed by each of a number of cores of a processor, and the input 110a could be a performance metric corresponding to the sum of all of the cores' operations-per-second. In another example, the output of the system could be a measure of the overall performance of the system 101a (e.g., a total number of operations per second performed by a server) and the input 110a could be a value corresponding to an increase or "speedup" of the server output, over time, relative to a baseline performance level. In another example, the outputs of the system could include one or more derived measures of overall system performance and the overall power consumption for the processor and the inputs to the system could include two values corresponding to relative changes in performance and power consumption. In this example the inputs and outputs are vectors where each vector component is a metric or signal.

A difference is then determined between the constraint 120a and the input 110a, and the difference is applied to the dynamic system 130a to generate a dynamic system output. The dynamic system could include one or more differentiators, integrators, gains, summations, multi-pole filters, sample-and-holds, leaky integrators, feedback loops, set-point values, nonlinear functions, nonlinear filters, polynomial functions, finite impulse response filters, infinite impulse response filters, internal state variables, or other dynamic elements configured to provide a dynamic, temporally-dependent output based on the difference input. The behavior of the dynamic system component 130a could be characterized by one or more parameters (e.g., one or more parameters of one of the filters, or of one or more poles and/or zeros thereof, or other elements of the dynamic system 130a). For example, the dynamic system could include a filter characterized by the amplitude and phase of one or more poles.

The output of the dynamic system component 130a is applied to the learned system model component 140a to generate one or more controller 100a outputs that can then be applied to the system 101a. The learned system model component 140a could generate one or more outputs that can then be applied to the controlled system 101a. The outputs of the learned system model could include one or more operational parameters for each one of a set of actuators or other elements of the controlled system 101a. For example, the controlled system 101a could be a computational substrate (e.g., a server, a GPU, a network of servers, a cloud computing system) that includes an array of computing units (e.g., discrete processors, processor cores, memory units, arithmetic logic units, server blades, texture processing units). In such an example, the output of the controller 100a could include one or more operational parameters for each of the computing units. Such operational parameters could include a clock speed, a memory bus or other bus speed, a bit width, whether a particular computing unit should be active or inactive, a number or identity of computing unit sub-components (e.g., ALUs, memory cells) that should be active, or some other operational parameters of one or more computing units of the controlled system 101a.

The learned system model component 140a could include one or more artificial neural networks, polynomial functions, nonlinear functions, multivariable functions, piecewise-defined functions, lookup tables, or other elements for translating the output of the dynamic system component 130a into one or more outputs that can be applied to control the controlled system 101a. In some examples, the learned system model component 140a could include multiple different learned system models (e.g., models having different underlying structure, models that were initialized to different starting conditions prior to training/learning, models that were exposed to different sets of training data, models that differed with respect to a training method used to train the models based on available training data, and/or models that differ with respect to some other consideration). In such examples, the learned system model component 140a could be configured to select one of the set of learned system models thereof and to apply the output of the dynamic system component 130a to the selected learned system model in order to generate the one or more outputs that can be applied to control the controlled system 101a. Such a selection could be performed, e.g., based on an estimate of the accuracy of each of the learned system models with respect to predicting the behavior of the controlled system 101a or based on some other determined degree of confidence in the sub-elements of the learned system model component 140a. Such estimates could be determined based on detected outputs from the controlled system 101a, e.g., determined based on such outputs by the learned system update module 150a.

Figure 1B:
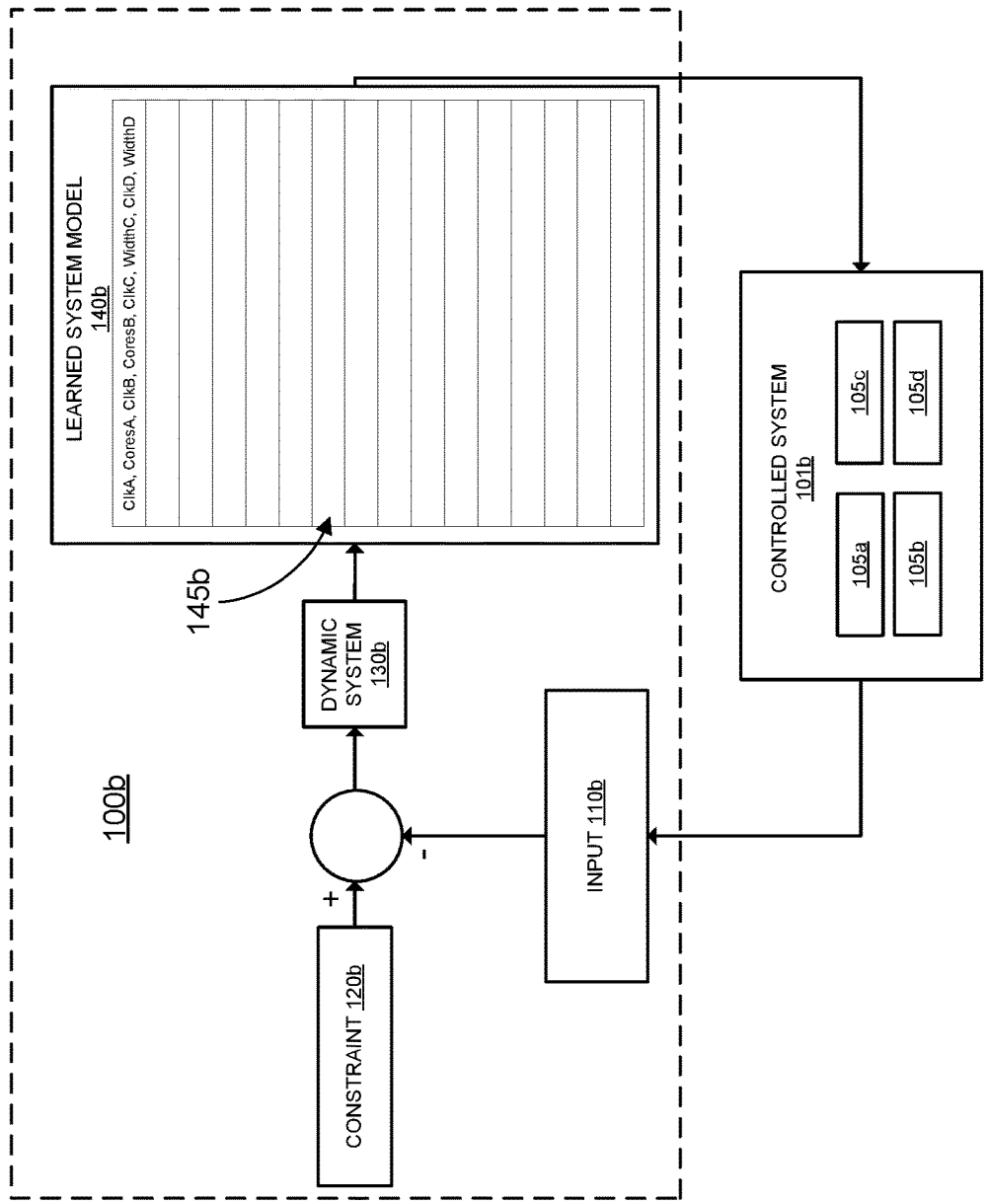
FIG. 1B depicts a schematic of an example hybrid controller.

For example, FIG. 1B shows an example hybrid controller 100b that is configured to control a system 101b of interest and that includes a constraint 120b, a dynamic system 130b, and a learned system model 140b and receives an input 110b from the controlled system 101b. The controlled system 101b includes four sub-systems 105a, 105b, 105c, 105d that could be, for example, computing units of the controlled system 101b. The learned system model 140b includes a lookup table 145b. The lookup table 145b includes a plurality of entries, each including at least one output that can be applied to control the system 101b. As shown by way of example, each entry of the lookup table 145b in FIG. 1B includes values for the clock speed of each of the computing units 105a, 105b, 105c, 105d of the controlled system 101b ("ClkA, ClkB, ClkC, ClkD"). Each entry of the lookup table 145b additionally includes an indication of how many cores of the first two computing units 105a, 105b should be active ("CoresA, CoresB") and the bit width of operations performed by the latter two computing units 105c, 105d ("WidthC, WidthD"). The value of the dynamic system component 130a output is used to select a particular entry, from the plurality of entries of the lookup table 145b, to output from the learned system model 140b to control the system 101b. For example, each entry of the lookup table 145b could correspond to a range of values of the dynamic system component 130a output.

The learned system model component of a hybrid controller as described herein (e.g., 140a, 140b) could be generated in a variety of ways. If a complete model of the system to be controlled is known, the complete model could be used to generate the learned system model (e.g., to generate the entries and corresponding dynamic system output value ranges of a lookup table). Additionally or alternatively, information about past and/or ongoing observed behavior of the system under control, or about the behavior of similar systems (e.g., other examples of a particular model of server or other system to be controlled), could be used to generate, update, and/or train a learned system model of a hybrid controller. For example, the learned system update module 150a could update and/or train the learned system model component 140a based on outputs detected from the controlled system 101a.

Updates to the learned system model, based on acquired additional data about the behavior and/or structure of the system under control, could be performed locally, by the same computational substrate (e.g., a processor, a server) that is used to implement the hybrid controller. Additionally or alternatively, such updates could be performed by a remote system (e.g., a cloud computing system) and information about the updated learned system model (e.g., values for one or more updated neural network weights or other parameters, an updated lookup table) could then be transmitted from the remote system to the system that is implementing the hybrid controller. Such a remote system could act as a service providing such learning-based updates for a plurality of different hybrid controllers. Such a remote system could generate such learning updates based on information about a system under control (e.g., applied control outputs, detected system outputs and/or performance metrics) that has been transmitted to the remote system from the system that is implementing the hybrid controller.

Such updating of the learned system model of a hybrid controller and/or learning about the behavior and/or structure of a system under control could be performed on an ongoing basis, e.g., at a specified rate or according to a specified schedule. Additionally or alternatively, an update to the learned system model could be performed responsive to detecting some event, e.g., detecting that the performance of the hybrid controller has fallen below a threshold performance level, detecting a sudden change in the performance of the system under control, detecting that the system under control has entered a specified undesired operational state, or some other event. The rate or timing at which the learned system model is updated and/or the magnitude or degree of such updates (e.g., a step size of a gradient descent or other iterative update process) could be determined based on an estimate of the accuracy of the learned system model or based on some other determined degree of confidence in the learned system model. For example, the learned system model could be updated more often and/or to a greater degree when the estimated accuracy of the model is low. Such estimates could be determined, e.g., based on an amount of error between the predicted system outputs generated by the learned system model and observed outputs of the system.

Such a determined degree of confidence could also be used to update or control other aspects of the operation of a hybrid controller. For example, a pole and/or zero of a dynamical system component could be adjusted, e.g., to reduce the responsiveness of the dynamical system component when the confidence in the learned system model is low. This could be done, e.g., to reduce the likelihood that the hybrid controller generates a control output that results in a goal (e.g., a maximum memory, a maximum power use) being exceeded when the learned system model is unable to accurately predict the behavior of the system under control.

In some examples, the system (e.g., 101a, 101b) controlled by the hybrid controller (e.g., 100a, 100b) includes a computational substrate (e.g., a server, computer, graphics processor, or other system that includes one or more controllers, processors, or other computing elements). In such examples, the hybrid controller could be implemented using a portion of the computational resources provided by the computational substrate of the system. Additionally or alternatively, the hybrid controller could be implemented on another controller, processor, or other computing element(s) (e.g., a purpose-built application-specific integrated circuit).

III. EXAMPLE MULTI-HYBRID-CONTROLLER ARCHITECTURES

As described above, a hybrid controller may be applied to control a system of interest. Such a hybrid controller provides many benefits, including the ability to incorporate observed information about the complex behavior and/or structure of the system under control and to provide temporally dynamic controller outputs that can be formally shown to exhibit certain guarantees regarding overall system performance, e.g., by modifying the poles or other temporal dynamics of the dynamic controller based on a determined degree of confidence in the accuracy of the learned system model such that the overall controller behaves more "conservatively" when confidence in the model is low. However, the performance of such a hybrid controller may be reduced under certain circumstances. For example, when a system under control and/or the environment of such a system deviates significantly from the state of the system and/or environment used to generate the hybrid controller (e.g., to train the learned system model element of the hybrid controller), the hybrid controller may produce sub-optimal outputs.

For example, the system under control could be a network of servers, and a hybrid controller used to govern the network of servers could perform sub-optimally if one of the servers experiences a critical failure. In another example, the system under control could be an industrial robot, and a hybrid controller used to govern the robot could perform sub-optimally if a joint servo of the robot becomes inoperable or exhibits a significant decrease in performance. In yet another example, the system under control could be a logistics network for delivery of packages, and a hybrid controller used to govern the network could perform sub-optimally if an airport used by the network is closed due to severe weather.

In such situations, the hybrid controller could underperform. However, the performance of the hybrid controller could be improved in these situations by altering the hybrid controller (e.g., by changing one or more constraints or other parameters of the hybrid controller, by updating a learned system model of the controller). This could include changing a constraint (e.g., 120a, 120b) of the controller (e.g., to specify an easier-to-achieve performance goal). In another example, the temporal dynamics of the controller could be modified by adjusting a filter pole or other parameter of the dynamic system element of the hybrid controller (e.g., to make the hybrid controller more or less responsive to changes in the output of the system under control). In yet another example, the learned system model of the hybrid controller could be modified. This could include updating the learned system model based on recent information about the system under control (e.g., performing an asynchronous update on the learned system model) or adjusting an update rate of an ongoing learning process applied to the learned system model (e.g., an update rate, a step size of a back-propagation or other learning algorithm).

In order to determine that such adjustments to the operation and/or configuration of the hybrid controller are indicated and/or to generate such adjustments, one or more supervisory controller(s) could be provided. Such a supervisor controller could receive, as inputs, the output(s) of a system under control and generate, as outputs, values for parameters or constraints of a hybrid controller, a timing of updates for elements (e.g., learned system models) of the hybrid controller, or some other outputs related to the operation and/or configuration of the hybrid controller.

Figure 2:
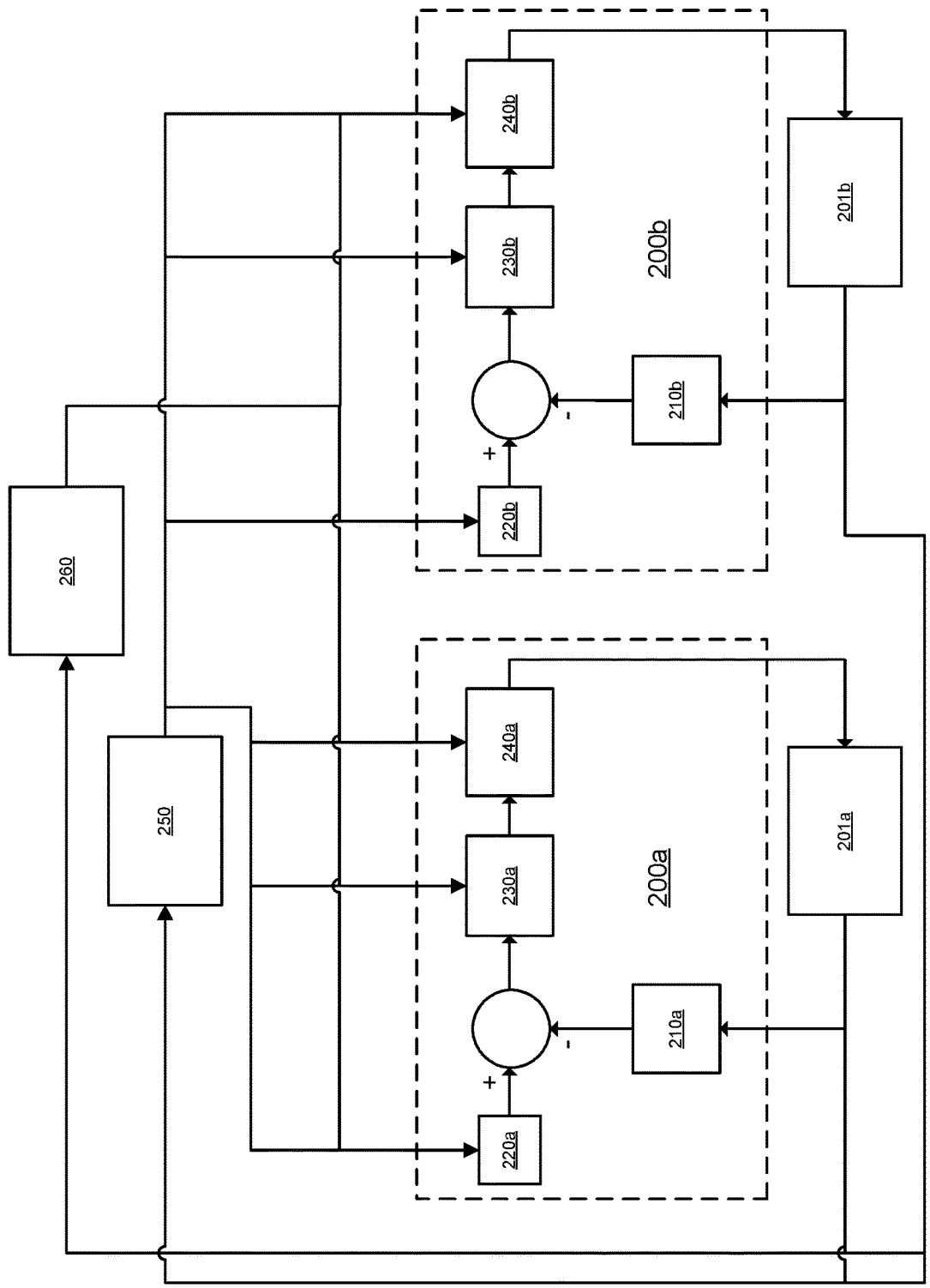
FIG. 2 depicts a schematic of an example network of controllers.

This is illustrated by way of example in FIG. 2. A first hybrid controller 200a is configured to provide control outputs to, and to detect one or more inputs from, a first system 201a. The first hybrid controller 200a includes an input 210a, a constraint 220a (e.g., an operational set-point), a dynamic system 230a, and a learned system model 240a. The output of the system 201a is also provided as input to a governing controller 250. The governing controller 250 is configured to, based on the detected output from the first system 201a, generate values and/or updates for one or more of the constraint 220a, the dynamic system 230a (e.g., a value for a pole of a filter or some other dynamic parameter), and/or the learned system model 240a (e.g., an updated learning rate or other parameter, an indication that the learned system model should be updated).

The governing controller 250 could be configured in a variety of ways. In some examples, the governing controller 250 could include one or more control elements, e.g., filters, feedback loops, integrators, gains, differentiators, summers, polynomial functions. In some examples, the governing controller 250 could, itself, be a hybrid controller. In some examples, the governing controller 250 could be configured to detect one or more patterns or conditions in the output of the first system 201a and responsively adjust the operation and/or configuration of the hybrid controller 200a. This could include the governing controller 250 explicitly detecting the presence of such patterns or conditions (e.g., comparing the system output to a threshold, using a template matching algorithm to detect a pattern) and/or elements of the controller (e.g., filters, lookup tables, feedback controllers) being configured to effect such detection.

Such detected events could include detecting the presence of one or more patterns or conditions in the system 201a output, in a filtered version of the system 201a output (e.g., in an integrated, bandpassed, differentiated, or otherwise filtered version of the system output 201a), in a version of the system 201a output offset by a set-point value (e.g., offset by the value of the constraint 220a), or a version of the output of the system 201a that has been otherwise processed. Detecting patterns, conditions, or events based on the system 201a output could include (i) detecting that the output of the system 201a is oscillating; (ii) detecting that the output of the system 201a responds too slowly (e.g., slower than a threshold rate) or too quickly (e.g., faster than a threshold rate) in response to changes in the input and/or environment of the system 201a; (iii) detecting that the output of the system 201a overshoots a set-point (e.g., by more than a threshold amount) in response to changes in the input and/or environment of the system 201a; and/or (iv) detecting that the output of the system 201a exhibits, relative to a set-point (e.g., the constraint 220a), a consistent bias (e.g., by more than a threshold amount).

Such a governing controller could be applied to provide such control/supervision to multiple different hybrid controllers. This is illustrated in FIG. 2, which also includes a second hybrid controller 200b that is configured to provide control outputs to, and to detect one or more inputs from, a second system 201b. The second hybrid controller 200b includes an input 210b, a constraint 220b, a dynamic system 230b, and a learned system model 240b. The output of the second system 201b is also provided as input to the governing controller 250. The governing controller 250 is additionally configured to, based on the detected output from the second system 201b, generate values and/or updates for one or more of the constraint 220b, the dynamic system 230b, and/or the learned system model 240b of the second controller 200b.

In such an example, the different systems 200a, 200b could be subsystems of a single, larger system. Thus, the governing controller 250 could be considered to be effectively controlling the overall system via the subordinate controllers 200a, 200b. For example, the systems 201a, 201b could be respective different servers of a datacenter. In another example, the systems 201a, 201b could be an engine and a hydraulic transducer of an airliner, systems which have traditionally employed classical control and whose performance could be improved by application of the methods described herein. In yet another example, the systems 201a, 201b could be a battery management unit and a motor of an autonomous vehicle.

Additionally or alternatively, multiple governing controllers could be applied to provide such control/supervision to one, or more than one, hybrid controller under supervision. This is illustrated in FIG. 2, which also includes a second governing controller 260. The second governing controller 260 receives input from one or both of the hybrid controllers 200a, 200b under supervision and can output updates and/or modifications to the constraint(s), dynamic system parameter(s), and/or parameter(s) of the learned system model(s) and/or of the process used to train and/or update the learned system model(s).

In such an example, the different governing controllers 250, 260 could represent different performance goals or constrains of a single system (e.g., the system 201a under control by the first hybrid controller 200a) and/or of a complex system that includes one than one sub-system (e.g., a complex system that includes the first 200a and second 200b systems).

IV. EXAMPLE APPLICATIONS AND EXPERIMENTAL RESULTS

The methods and systems described herein have been applied to a variety of applications and have provided improved operation of systems according to those applications. The control methods described herein have a broad applicability to any system whose efficient operation is desired in light of multiple competing goals. These control methods may be applied to the operation of mobile devices, datacenter servers and other equipment, distributed software systems, video delivery networks, autonomous vehicles, graphics processing units, mobile radios, satellite global positioning receivers, or other complex systems.

In one application, the control methods described herein were applied to improve the performance of the Samsung Exynos 5422 processor which shipped in the Samsung Galaxy S5 handset. In this application, the present methods achieved a 14% reduction in energy use on complex benchmarks, at the same or better levels of performance, compared to alternative state-of-the-art optimization methods (including AI). The present methods also achieved a greater than 40% reduction in energy use compared to the stock Samsung/Android optimization software.

In another application, the control methods described herein were applied to improve the performance of an Intel Xeon E5 2600 series dual processor with 64 GB ram in executing eight different applications including web search, digital signal processing, clustering, image search, video encoding, and image tracking (the applications sometimes ran concurrently). In this application, the present methods achieved an overall 8% reduction in energy use (as measured "from the wall", for the entire computer system), relative to alternative state-of-the-art optimization methods, including AI.

In yet another application, the control methods described herein were applied to improve the performance of a complex software distributed storage and processing service running MapReduce, Cassandra, and Hadoop Database/Hadoop Distributed File System. In this application, the present methods achieved a 34% speedup and exhibited 60% fewer crashes relative to alternative state-of-the-art optimization methods. This was especially impressive, as the controller was not provided with any a priori information about the underlying structure or capabilities of the storage and processing service. Instead, the controller operated over time to learn this information about the controlled system.

In an additional application, the control methods described herein were applied to improve the performance of an image processing system of an autonomous vehicle. In this application, the present methods enabled the image processing system to continue to perform and react despite the failure of 75% of the system's hardware capability. In another example, the control methods described herein were applied to improve the performance of a Cray CX40 system performing molecular dynamics simulations using the LAMMPS framework. The control methods were applied to increase the number of molecular dynamics analyses completed while staying within a specified power budget. In this application (which indicates the applicability of the methods herein to current and future exascale supercomputers and/or supercomputing environments as well as others), the applications of the hierarchical and distributed control methods described herein resulted in an increase, with respect to number of analyses completed within the power budget, of approximately 30% compared to state-of-the-art and other alternative power and/or performance management methods.

V. EXAMPLE METHODS

Figure 3:
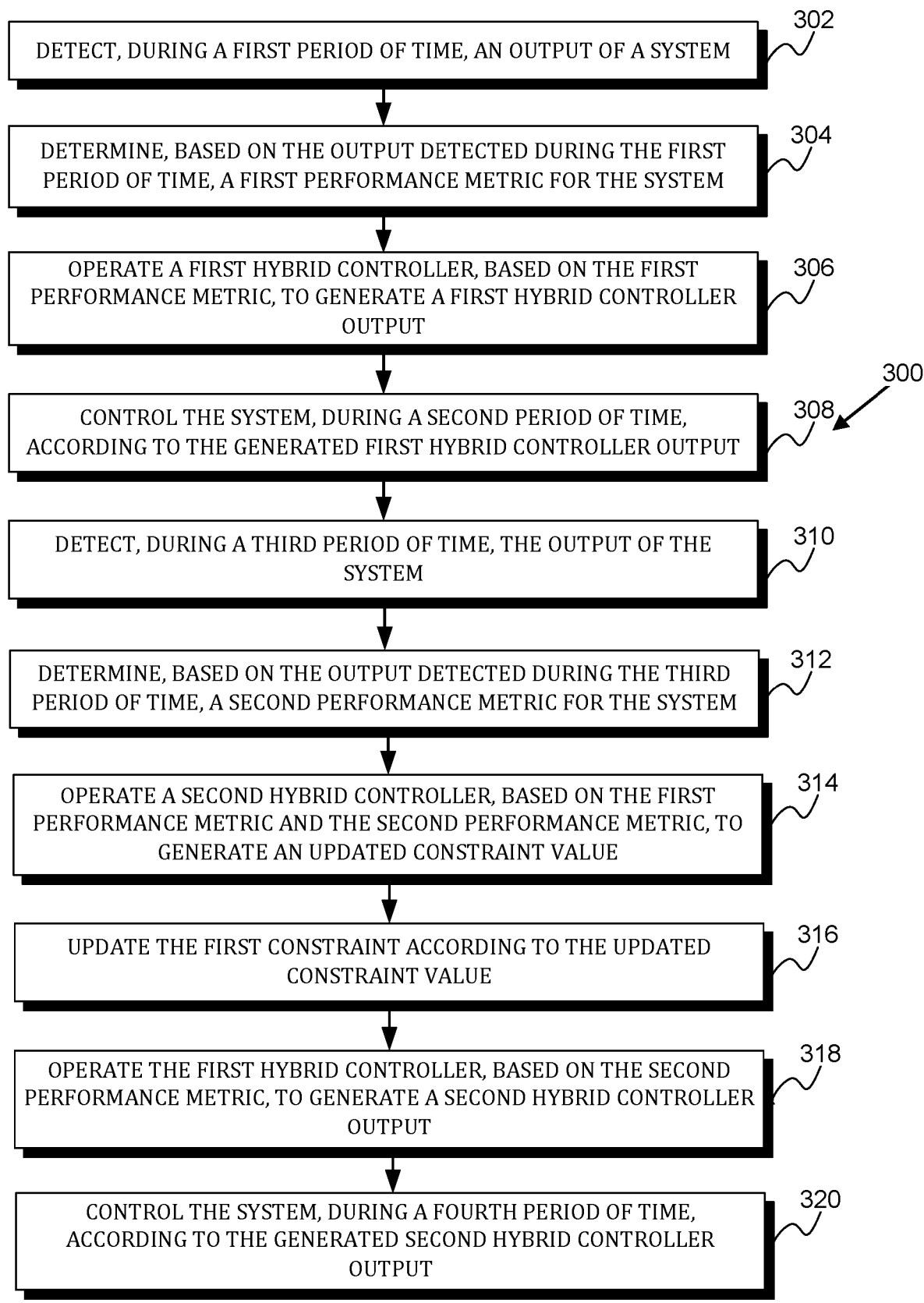
FIG. 3 is a flowchart of a method.

FIG. 3 is a flowchart of a method 300 for controlling a system as described herein. The method 300 includes detecting, during a first period of time, an output of a system (302). The method 300 additionally includes determining, based on the output detected during the first period of time, a first performance metric for the system (304). The method 300 additionally includes operating a first hybrid controller, based on the first performance metric, to generate a first hybrid controller output (306). The first hybrid controller includes a first constraint, a first dynamic system, and a first learned system model. Operating the first hybrid controller to generate the first hybrid controller output includes: (i) determining a first difference between the first performance metric and the first constraint; (ii) applying the determined first difference to the first dynamic system to generate a first dynamic system output; and (iii) applying the generated first dynamic output to the first learned system model to generate the first hybrid controller output. The method 300 additionally includes controlling the system, during a second period of time, according to the generated first hybrid controller output (308) and detecting, during a third period of time, the output of the system (310). The method 300 additionally includes determining, based on the output detected during the third period of time, a second performance metric for the system (312) and operating a second hybrid controller, based on the first performance metric and the second performance metric, to generate an updated constraint value (314). The method 300 additionally includes updating the first constraint according to the updated constraint value (316), operating the updated first hybrid controller, based on the second performance metric, to generate a second hybrid controller output (318), and controlling the system, during a fourth period of time, according to the generated second hybrid controller output (320).

The method 300 could include additional elements or features. In some embodiments, the second hybrid controller could provide additional or alternative outputs to modify the operations and/or configuration of the first hybrid controller (e.g., modifying a dynamic parameter of the dynamic system of the first controller, altering a parameter and/or initiating an update of the learned system model of the first controller). In some embodiments, the second hybrid controller could additionally receive inputs from an additional system, and provide outputs related to the operation and/or configuration of an additional controller (e.g., a hybrid controller) that is configured to control the additional system. Additionally or alternatively, the first hybrid controller could receive updated parameter values from an additional supervisory controller (e.g., an additional supervisory hybrid controller).

Figure 4:
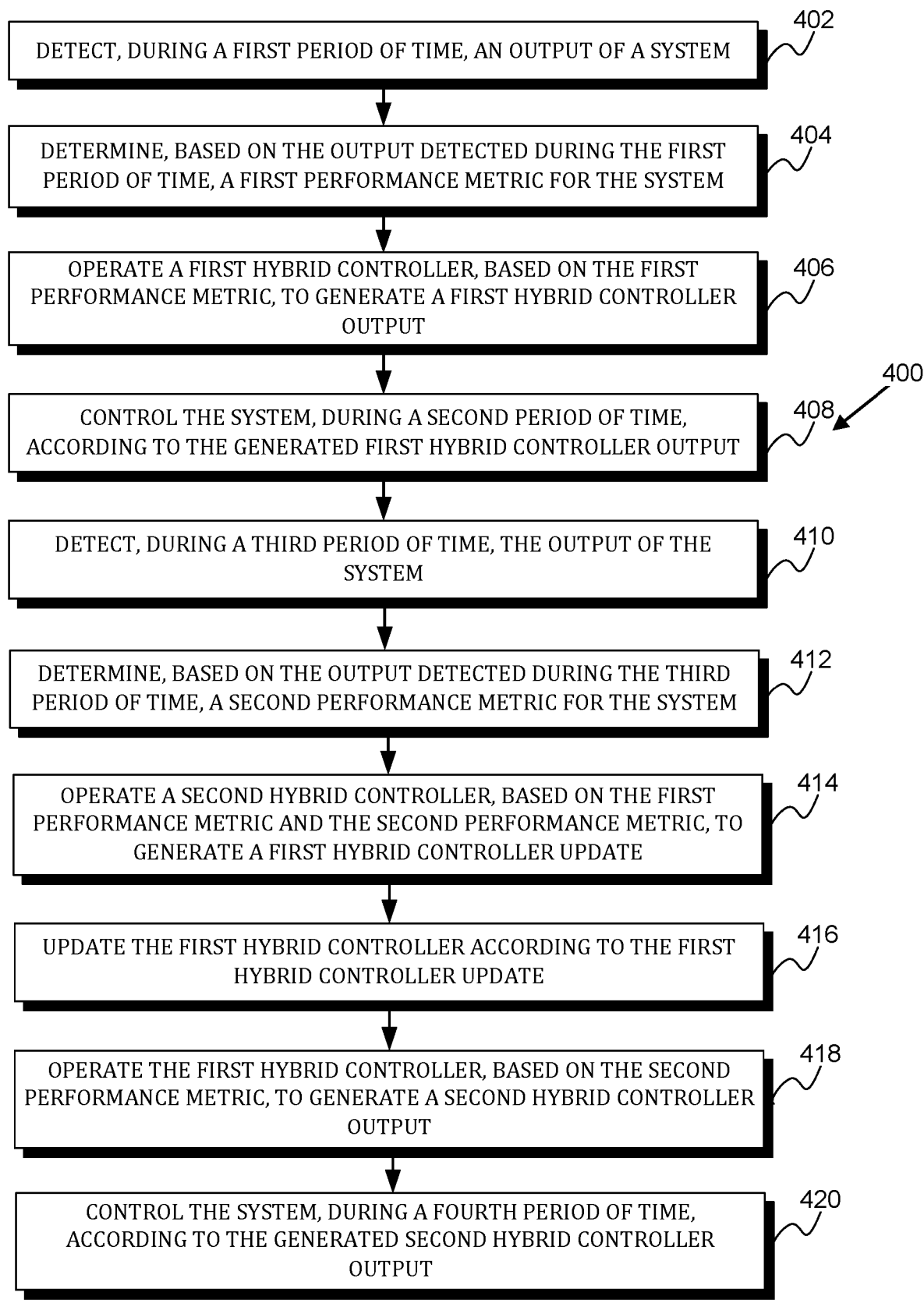
FIG. 4 is a flowchart of a method.

FIG. 4 is a flowchart of a method 400 for controlling a system as described herein. The method 400 includes detecting, during a first period of time, an output of a system (402). The method 400 additionally includes determining, based on the output detected during the first period of time, a first performance metric for the system (404). The method 400 additionally includes operating a first hybrid controller, based on the first performance metric, to generate a first hybrid controller output (406).

The first hybrid controller includes a first constraint, a first dynamic system, a first learned system model, and a first learned system update module. The first learned system update module is configured to update the first learned system model based on at least one output detected from the system and to update the first learned system model according to at least one of a timing or a rate corresponding to a first learning parameter. The first dynamic system has a first dynamic parameter that corresponds to an overall responsiveness of the first dynamic system. Operating the first hybrid controller to generate the first hybrid controller output includes: (i) determining a first difference between the first performance metric and the first constraint; (ii) applying the determined first difference to the first dynamic system to generate a first dynamic system output; and (iii) applying the generated first dynamic output to the first learned system model to generate the first hybrid controller output.

The method 400 additionally includes controlling the system, during a second period of time, according to the generated first hybrid controller output (408) and detecting, during a third period of time, the output of the system (410). The method 400 additionally includes determining, based on the output detected during the third period of time, a second performance metric for the system (412) and operating a second hybrid controller, based on the first performance metric and the second performance metric, to generate a first hybrid controller update (414). The first hybrid controller update includes at least one of an updated first constraint value, an updated first dynamic parameter, or an updated first learning parameter. The method 400 additionally includes updating the first hybrid controller according to the first hybrid controller update (416), operating the updated first hybrid controller, based on the second performance metric, to generate a second hybrid controller output (418), and controlling the system, during a fourth period of time, according to the generated second hybrid controller output (420).

The method 400 could include additional elements or features. In some embodiments, the second hybrid controller could additionally receive inputs from an additional system, and provide outputs related to the operation and/or configuration of an additional controller (e.g., a hybrid controller) that is configured to control the additional system. Additionally or alternatively, the first hybrid controller could receive updated parameter values from an additional supervisory controller (e.g., an additional supervisory hybrid controller).

VI. EXAMPLE APPLICATIONS

Hybrid controllers/HOFs, whether applied in direct control, supervision, simulation, development, or on existing/legacy systems or other control methods can fundamentally change and improve the performance and behavior of the systems they are deployed on—while a HOF is generalizable, HOFs deployed into a system or systems can change the system performance and characteristics. There is also a foundational change in operation—the system is now allocating the available resources towards a goal or goals, and the system is now responsive to unknown or unpredicted events as well as events contained and contemplated in whatever previous model and method was used to "control" the system.

One example embodiment of distributed or hierarchical HOFs includes a top-level HOF that is implemented to control a cloud computing environment distributed across several datacenters to set performance of the overall system, which includes a distributed data warehouse and web server, and several edge and other IoT devices that are asynchronously (and in some cases unpredictably/erratically) connected to the parent HOF(s). Some of these devices may be legacy systems which do not have a HOF controlling them but are part of the constraints and feedback the various HOF based systems.

Another example embodiment includes a system with distributed and/or hierarchical HOFs that includes complex systems that are a part of one or more datacenters or other distributed complex systems, which communicate with and may be parts (whether as a whole, parent, child, or simply contributor) of other complex systems that may or may not themselves be run by HOFs. These other complex systems may include "edge", IoT, or on-premise devices such as car, drone, phone, satellite, "connected" sensors, servers, cameras and others. These systems may communicate with (and in doing so, may or may not be part of, and may join or leave) the larger or other systems synchronously and/or asynchronously, in a predictable and/or erratic fashion.

In another example embodiment, rather than changing a constraint or knob (a tunable parameter) to meet goals one can dynamically change the underlying model in addition to or instead of the already exposed knob(s). This may be done for a variety of reasons, including to adapt to a "new normal" due to a system or external change.

Yet another example embodiment is a distributed (cloud) data framework such as Hadoop where physically available memory is a critical constraint and often the cause of crashes/errors. In this HOF embodiment, available memory is set as a "hard" goal, as the upper bound may not be violated by the system. As many different operations and variables affect memory usage in ways that are not well represented by the model utilized by a single or multiple HOFs, and regardless of whether other aberrant behavior is detected (such as a "new normal" or cascading failure), instead of dynamically changing goals or constraints or models, the pole value of the dynamic system of the HOF(s) is changed and may be dynamic as the hard goal is approached or drifted from. This may be done on, e.g., a single HOF (regardless of underlying system, distributed or not), hierarchical, supervisory, or simulated HOF or HOFs.

The techniques in the two above embodiments may be extended so that a variety of "hard" and "soft" goals may be intermingled with multiple underlying models to change system or systems' performance.

The above techniques may also be variously or concurrently employed in the event of various other types of external or internal failures, such as cascading failure caused by malicious actors or network effect demand.

Yet another example embodiment is an otherwise ad-hoc system that forms, for example, between autonomous cars and/or drones that share a particular characteristic (for instance, temporal space, ride share network, communications provider, destination, etc.) some of which are themselves controlled by HOFs. New (purpose driven) HOF-based systems for supervision, goal setting, as well as control of and learning from the hierarchical and distributed existing HOFs is all part of this ad-hoc embodiment.

Yet another example embodiment is a warehouse distribution system. The warehouse system itself is part of several larger complex systems (for instance, trucking, manufacturers, and others) who themselves are often parts of larger interdependent complex systems. Inside the warehouse, there may be many systems with competing and shared constraints and goals, such as package throughput (amount of packages arriving and departing over a period of time), location in the warehouse (where and on what shelf) and density (how closely/"tightly") packages are able to be located given shape and weight. This all must be taken into consideration as other systems also affect the warehouse logistics system, such as robots, worker availability, holidays, weather, etc. in continuous, dynamic, and not always predictable ways. In this embodiment, the HOF(s) controlling the warehouse is able to automatically optimize tradeoffs, for instance prioritizing density over high throughput when a truck or air shipment becomes delayed.

Another example embodiment is within the described warehouse environment, where a robot becomes unavailable or behaves erratically (e.g., because a human worker was fired and damaged the robot in response). Though these events are unanticipated, this becomes a new normal (i.e., the complete or partial loss of functionality of the damaged robot) for some time period. In this embodiment, a supervisory HOF may change the goal(s), constraint(s), and other resources of the available human workers and robots to meet a short term goal (such as moving a person and robot over to the "unloading" local HOF to continue meet the local goal of unloading a container) and then changing other local systems and/or global goal(s) (such as daily package throughput, density, or location) to meet this "new normal" for however long it may last (until the next shift, or until new robots are delivered).

Another example embodiment is in the same logistics complex system, but this time as a global scale merchant that provides guaranteed delivery dates (for example, in two days) to some portion of customers, and has a network of warehouses, transportation modalities (e.g., plane, train, truck, drone, various $3^{rd}$ parties). Each system operates with its own goals and constraints and is also part of the larger complex system, some of which have HOFs controlling them, and some that do not. As weather, road, and other conditions change, an administrator or administrators (whether automated, semiautomated, human, or some other form of control) including a HOF or HOFs may update overall or complex system goals (e.g., two days to four days) and all of the rest of the HOF enabled systems can then optimize the resources to the new goal(s).

The above embodiment (complex global logistics system) includes one or more HOFs generating updates to goals, constraints, models, pole values, hard and soft goals, "virtual" goals and constraints, and others in response to an unanticipated event or events. For instance, a natural or man-made disaster may occur that may make delivery to some addresses impossible for a time, and severely delayed for others. Extra available resources may then be allocated towards these disaster deliveries, or towards the normal deliveries, allowing the goals, constraints, and models to be variously updated to the new normal and various failure modes of previously functioning local and/or global complex systems.

Another example embodiment includes applying a HOF or HOFs to a system or systems for testing or informative (rather than control) purposes (during development, deployment, or otherwise), and information is collected about various performance and configuration parameters utilizing the various capabilities of a HOF or HOFs. The resulting information may be used to inform both the configuration management and goal setting of the same, similar, or different systems.

A HOF or HOFs may have one or more performance goals such that one or more models are dynamically selected (dynamically swapped or changed) based upon operational conditions, regardless of the configuration of the system's parameters or constraints at the time of selection. In other words, the underlying model of the system is itself available to be a tunable optimization parameter in service of the performance goal or goals.

A HOF or HOFs may control (either at the O/S or at some other level) a "real time" system with various hard constraints (that themselves may or may not change dynamically or over time depending on needs of the user(s) and the outside environment and performance ability of such a system).

A HOF or HOFs may be used to test and evaluate the performance envelopes of various configuration settings on an existing complex system without the underlying complex system having its own HOF or HOFs.

A HOF or HOFs may be used to test and evaluate the performance envelopes of various performance goals on an existing complex system to establish the operational and out-of-bounds envelope of various configuration settings.

A HOF or HOFs may be used to test and evaluate the performance envelopes of various performance goals on an existing complex system to establish the operational envelope of various underlying performance models.

A HOF or HOFs may be used to test and evaluate the performance envelopes of various performance goals that may change over time on an existing complex system to establish the operational envelope of various underlying performance models.

A HOF or HOFs may be deployed to utilize information gained and collected into a library from the above techniques and applied to existing systems.

A HOF or HOFs may be deployed to utilize information gained and collected into a library from the above techniques and applied to systems under development.

The information gained and collected from testing various complex systems with a HOF may be used to design and develop new systems, including performance envelopes and constraints of such systems.

Information gained and collected from using a supervisory HOF on a complex system or systems may be applied to design and develop new systems and models that may or may not include the original complex system or systems under supervision.

Simulation may be used to develop a new HOF or HOFs based on the information gained and collected from testing with a HOF or HOFs, running complex systems that include a HOF or HOFs, supervising with a HOF or HOFs, or a combination of some or all those.

Simulation may be used to develop new systems based on the information gained and collected from testing with a HOF or HOFs, running complex systems that include a HOF or HOFs, supervising with a HOF or HOFs, or a combination of some or all those.

Simulation may be combined with a supervisory HOF to improve performance of a complex system or system.

Simulation may be applied to improve performance of a system or system either managed by a HOF or HOFs or running a HOF or HOFs.

A complex system may include multiple HOFs, one or more of which are themselves taught to set performance goals and/or configuration parameters for any time or any conditions using artificial intelligence and/or neural networks or other advanced learning methods.

A HOF or HOFs may be applied to an evaluation/discriminative network and/or the generative network in a generative adversarial network (GAN) to constrain or otherwise improve performance (for example speed or accuracy).

Information (such as performance meta-data) generated by an operating HOF or HOFs may be applied to improve underlying or new machine learning or AI models.

A HOF may be used to control a complex system only when that complex system is detected as being out of bounds, utilizing the information generated from that use to improve future and current performance of machine learning or AI models.

Multiple HOFs may be deployed on a smart phone or other device as a distributed control system where one HOF establishes the main performance goal or goals and dynamically configures other HOFs that are uniquely related to the operating parameters of the application or applications then currently active.

Any of the disclosed methods may be applied to replace a traditional control based solution (such as a PID) with a HOF whenever the traditional control solution becomes obsolete or otherwise provides inferior performance.

VII. CONCLUSION

The above detailed description describes various features and functions of the disclosed systems, devices, and methods with reference to the accompanying figures. In the figures, similar symbols typically identify similar components, unless context indicates otherwise. The illustrative embodiments described in the detailed description, figures, and claims are not meant to be limiting. Other embodiments can be utilized, and other changes can be made, without departing from the scope of the subject matter presented herein. It will be readily understood that the aspects of the present disclosure, as generally described herein, and illustrated in the figures, can be arranged, substituted, combined, separated, and designed in a wide variety of different configurations, all of which are explicitly contemplated herein.

With respect to any or all of the message flow diagrams, scenarios, and flowcharts in the figures and as discussed herein, each step, block and/or communication may represent a processing of information and/or a transmission of information in accordance with example embodiments. Alternative embodiments are included within the scope of these example embodiments. In these alternative embodiments, for example, functions described as steps, blocks, transmissions, communications, requests, responses, and/or messages may be executed out of order from that shown or discussed, including in substantially concurrent or in reverse order, depending on the functionality involved. Further, more or fewer steps, blocks and/or functions may be used with any of the message flow diagrams, scenarios, and flow charts discussed herein, and these message flow diagrams, scenarios, and flow charts may be combined with one another, in part or in whole.

A step or block that represents a processing of information may correspond to circuitry that can be configured to perform the specific logical functions of a herein-described method or technique. Alternatively or additionally, a step or block that represents a processing of information may correspond to a module, a segment, or a portion of program code (including related data). The program code may include one or more instructions executable by a processor for implementing specific logical functions or actions in the method or technique. The program code and/or related data may be stored on any type of computer-readable medium, such as a storage device, including a disk drive, a hard drive, or other storage media.

The computer-readable medium may also include non-transitory computer-readable media such as computer-readable media that stores data for short periods of time like register memory, processor cache, and/or random access memory (RAM). The computer-readable media may also include non-transitory computer-readable media that stores program code and/or data for longer periods of time, such as secondary or persistent long term storage, like read only memory (ROM), optical or magnetic disks, and/or compact-disc read only memory (CD-ROM), for example. The computer-readable media may also be any other volatile or non-volatile storage systems. A computer-readable medium may be considered a computer-readable storage medium, for example, or a tangible storage device.

Moreover, a step or block that represents one or more information transmissions may correspond to information transmissions between software and/or hardware modules in the same physical device. However, other information transmissions may be between software modules and/or hardware modules in different physical devices.

While various aspects and embodiments have been disclosed herein, other aspects and embodiments will be apparent to those skilled in the art. The various aspects and embodiments disclosed herein are for purposes of illustration and are not intended to be limiting, with the true scope being indicated by the following claims.

We claim:

1. A method comprising:
   detecting, during a first period of time, an output of a system;
   determining, based on the output detected during the first period of time, a first performance metric for the system;
   operating a first hybrid controller, based on the first performance metric, to generate a first hybrid controller output, wherein the first hybrid controller comprises a first constraint, a first dynamic system, and a first learned system model, wherein operating the first hybrid controller to generate the first hybrid controller output comprises:

determining a first difference between the first performance metric and the first constraint;
applying the determined first difference to the first dynamic system to generate a first dynamic system output; and
applying the generated first dynamic system output to the first learned system model to generate the first hybrid controller output;
controlling the system, during a second period of time, according to the generated first hybrid controller output;
detecting, during a third period of time, the output of the system;
determining, based on the output detected during the third period of time, a second performance metric for the system;
operating a second hybrid controller, based on the first performance metric and the second performance metric, to generate an updated constraint value;
updating the first constraint according to the updated constraint value;
subsequent to updating the first constraint, operating the first hybrid controller, based on the second performance metric, to generate a second hybrid controller output; and
controlling the system, during a fourth period of time, according to the generated second hybrid controller output.

2. The method of claim 1, wherein the first learned system model comprises a lookup table, and wherein applying the generated first dynamic system output to the first learned system model to generate the first hybrid controller output comprises selecting an entry in the lookup table based on a value of the first dynamic system output.

3. The method of claim 1, wherein the first dynamic system is characterized by a pole, further comprising:
determining, based on the output of the system detected during the first period of time, a degree of confidence in the first learned system model;
determining, based on the determined degree of confidence, an updated value for the pole of the first dynamic system; and
updating the first dynamic system such that the pole of the updated dynamic system has a value corresponding to the determined updated value.

4. The method of claim 1, further comprising:
updating the learned system model based on the output of the system detected during the first period of time.

5. The method of claim 4, further comprising:
operating the second hybrid controller, based on the first performance metric and the second performance metric, to determine that the learned system model should be updated, wherein updating the learned system model based on the output of the system detected during the first period of time is performed responsive to the second hybrid controller determining that the learned system model should be updated.

6. The method of claim 4, wherein updating the learned system model based on the output of the system detected during the first period of time comprises:
transmitting, to a remote system, an indication of the output of the system detected during the first period of time; and
receiving, from the remote system, an indication of an update to the learned system model.

7. The method of claim 4, wherein updating the learned system model based on the output of the system detected during the first period of time comprises selecting a learned system model from a set of different learned system models.

8. The method of claim 1, wherein the system comprises a computing substrate having two or more computing units, each having a respective operational state, wherein the first hybrid controller output includes an indication of an operational state for each of the two or more computing units of the computing substrate.

9. The method of claim 8, wherein the operational state of at least one of the computing units of the computational substrate includes a clock speed.

10. The method of claim 1, wherein the second hybrid controller comprises a second constraint, a second dynamic system, and a second learned system model, wherein operating the second hybrid controller, based on the first performance metric and the second performance metric, to generate an updated constraint value comprises:
applying at least one of the first performance metric or the second performance metric to the second dynamic system to generate a second dynamic system output; and
applying the generated second dynamic system output to the second learned system model to generate the updated constraint value.

11. The method of claim 10, further comprising:
detecting, during the first period of time, a second output of a second system;
determining, based on the second output detected during the first period of time, a third performance metric for the second system;
operating a third hybrid controller, based on the third performance metric, to generate a third hybrid controller output, wherein the third hybrid controller comprises a third constraint, a third dynamic system, and a third learned system model, wherein operating the third hybrid controller to generate the third hybrid controller output comprises:
determining a second difference between the third performance metric and the third constraint;
applying the determined second difference to the third dynamic system to generate a third dynamic system output; and
applying the generated third dynamic system output to the third learned system model to generate the third hybrid controller output;
controlling the second system, during the second period of time, according to the generated third hybrid controller output;
detecting, during the third period of time, the second output of the second system;
determining, based on the second output detected from the second system during the third period of time, a fourth performance metric for the second system;
operating the second hybrid controller, based on the third performance metric and the fourth performance metric, to generate an additional updated constraint value;
updating the third constraint according to the additional updated constraint value;
operating the third hybrid controller, based on the fourth performance metric, to generate a fourth hybrid controller output; and
controlling the second system, during the fourth period of time, according to the generated fourth hybrid controller output.

12. The method of claim 1, wherein operating the second hybrid controller, based on the first performance metric and the second performance metric, to generate the updated constraint value comprises detecting, based on the first performance metric and the second performance metric, that the output of the system is oscillating.

13. The method of claim 1, wherein operating the second hybrid controller, based on the first performance metric and the second performance metric, to generate the updated constraint value comprises detecting, based on the first performance metric and the second performance metric, that the output of the system responds more slowly than a threshold rate.

14. The method of claim 1, wherein operating the second hybrid controller, based on the first performance metric and the second performance metric, to generate the updated constraint value comprises detecting, based on the first performance metric and the second performance metric, that the output of the system exhibits a bias relative to the first constraint.

15. A method comprising:
  detecting, during a first period of time, an output of a system;
  determining, based on the output detected during the first period of time, a first performance metric for the system;
  operating a first hybrid controller, based on the first performance metric, to generate a first hybrid controller output, wherein the first hybrid controller comprises a first constraint, a first dynamic system, a first learned system model, and a first learned system update module, wherein the first learned system update module is configured to update the first learned system model based on at least one output detected from the system, wherein the first learned system update module is configured to update the first learned system model according to at least one of a timing or a rate corresponding to a first learning parameter, wherein the first dynamic system has a first dynamic parameter that corresponds to an overall responsiveness of the first dynamic system, wherein operating the first hybrid controller to generate the first hybrid controller output comprises:
    determining a first difference between the first performance metric and the first constraint;
    applying the determined first difference to the first dynamic system to generate a first dynamic system output; and
    applying the generated first dynamic output to the first learned system model to generate the first controller output;
  controlling the system, during a second period of time, according to the generated first hybrid controller output;
  detecting, during a third period of time, the output of the system;
  determining, based on the output detected during the third period of time, a second performance metric for the system;
  operating a second hybrid controller, based on the first performance metric and the second performance metric, to generate a first hybrid controller update, wherein the first hybrid controller update includes at least one of an updated first constraint value, an updated first dynamic parameter, or an updated first learning parameter;
  updating the first hybrid controller according to the first hybrid controller update;

operating the updated first hybrid controller, based on the second performance metric, to generate a second hybrid controller output; and
controlling the system, during a fourth period of time, according to the generated second hybrid controller output.

16. The method of claim 15, wherein the first dynamic system is characterized by a pole, wherein the pole is related to the first dynamic parameter, and the method further comprising:
  determining, based on the output of the system detected during the first period of time, a degree of confidence in the first learned system model;
  determining, based on the determined degree of confidence, an updated value for the pole of the first dynamic system; and
  updating the first dynamic parameter such that the pole of the updated first dynamic system has a value corresponding to the determined updated value.

17. The method of claim 16, wherein the second hybrid controller comprises a second constraint, a second dynamic system, and a second learned system model, wherein operating the second hybrid controller, based on the first performance metric and the second performance metric, to generate an first hybrid controller update comprises:
  applying at least one of the first performance metric or the second performance metric to the second dynamic system to generate a second dynamic system output; and
  applying the generated second dynamic system output to the second learned system model to generate the first hybrid controller update.

18. The method of claim 17, further comprising:
  detecting, during the first period of time, a second output of a second system;
  determining, based on the second output detected during the first period of time, a third performance metric for the second system;
  operating a third hybrid controller, based on the third performance metric, to generate a third hybrid controller output, wherein the third hybrid controller comprises a third constraint, a third dynamic system, a third learned system model, and a third learned system update module, wherein the third learned system update module is configured to update the third learned system model based on at least one output detected from the second system, wherein the third learned system update module is configured to update the third learned system model according to at least one of a timing or a rate corresponding to a third learning parameter, wherein the third dynamic system has a third dynamic parameter that corresponds to an overall responsiveness of the third dynamic system, wherein operating the third hybrid controller to generate the third hybrid controller output comprises:
    determining a second difference between the third performance metric and the third constraint;
    applying the determined second difference to the third dynamic system to generate a third dynamic system output; and
    applying the generated third dynamic system output to the third learned system model to generate the third hybrid controller output;
  controlling the second system, during the second period of time, according to the generated third hybrid controller output;

detecting, during the third period of time, the second output of the second system;

determining, based on the second output detected from the second system during the third period of time, a fourth performance metric for the second system;

operating the second hybrid controller, based on the third performance metric and the fourth performance metric, to generate a third hybrid controller update, wherein the third hybrid controller update includes at least one of an updated third constraint value, an updated third dynamic parameter, or an updated third learning parameter;

updating the third hybrid controller according to the third hybrid controller update;

operating the third hybrid controller, based on the fourth performance metric, to generate a fourth hybrid controller output; and controlling the second system, during the fourth period of time, according to the generated fourth hybrid controller output.

19. The method of claim 18, further comprising:

operating a fourth hybrid controller, based on the first performance metric and the second performance metric, to generate an additional first hybrid controller update, wherein the additional first hybrid controller update includes at least one of an updated first constraint value, an updated first dynamic parameter, or an updated first learning parameter; and updating the first hybrid controller according to the additional first hybrid controller update, wherein operating the updated first hybrid controller, based on the second performance metric, to generate a second hybrid controller output comprises operating the first hybrid controller that has been updated by both the first hybrid controller update and the additional first hybrid controller update to generate the second hybrid controller output.

20. The method of claim 17, further comprising:

operating a third hybrid controller, based on the first performance metric and the second performance metric, to generate an additional first hybrid controller update, wherein the additional first hybrid controller update includes at least one of an updated first constraint value, an updated first dynamic parameter, or an updated first learning parameter; and updating the first hybrid controller according to the additional first hybrid controller update, wherein operating the updated first hybrid controller, based on the second performance metric, to generate a second hybrid controller output comprises operating the first hybrid controller that has been updated by both the first hybrid controller update and the additional first hybrid controller update to generate the second hybrid controller output.

* * * * *